(12) United States Patent
Nakamura et al.

(10) Patent No.: US 7,478,273 B2
(45) Date of Patent: Jan. 13, 2009

(54) COMPUTER SYSTEM INCLUDING ACTIVE SYSTEM AND REDUNDANT SYSTEM AND STATE ACQUISITION METHOD

(75) Inventors: Nobutatsu Nakamura, Tokyo (JP); Ryuichi Hiraike, Tokyo (JP)

(73) Assignee: NEC Corporation, Tokyo (JP)

( * ) Notice: Subject to any disclaimer, the term of this patent is extended or adjusted under 35 U.S.C. 154(b) by 687 days.

(21) Appl. No.: 11/001,292

(22) Filed: Dec. 2, 2004

(65) Prior Publication Data
US 2005/0144513 A1    Jun. 30, 2005

(30) Foreign Application Priority Data
Dec. 2, 2003   (JP) ............................. 2003-402742

(51) Int. Cl.
*G06F 11/00* (2006.01)
(52) U.S. Cl. .......................................... 714/11; 714/15
(58) Field of Classification Search .................... 714/11, 714/13, 15
See application file for complete search history.

(56) References Cited

U.S. PATENT DOCUMENTS

| 5,896,523 | A | * | 4/1999 | Bissett et al. ................ 713/400 |
| 6,035,415 | A | * | 3/2000 | Fleming ....................... 714/11 |
| 6,757,811 | B1 | * | 6/2004 | Mukherjee ................... 712/220 |
| 6,948,092 | B2 | * | 9/2005 | Kondo et al. ................... 714/12 |

FOREIGN PATENT DOCUMENTS

| JP | 04-367949 | 12/1992 |
| JP | 09-091183 | 4/1997 |
| JP | 09-130446 | 5/1997 |
| JP | 10-198578 | 7/1998 |
| JP | 2001-333141 | 11/2001 |
| JP | 2003-114811 | 4/2003 |

* cited by examiner

*Primary Examiner*—Marc Duncan
(74) *Attorney, Agent, or Firm*—Dickstein Shapiro LLP

(57) ABSTRACT

To make it possible to store a state immediately before occurrence of a trouble with little influence on normal program processing, separately from an active system in which a program operates, a redundant system is provided in which the same program as the program operates in the same execution environment as the active system. A delay execution control section gives the redundant system the same processing request as a processing request given to the active system, with a delay. When a trouble monitoring section detects a trouble of the active system, a state storage control section acquires data indicating a state of the redundant system and stores it in a state data storing section. Because the same program is executed with a delay in the redundant system having the same execution environment as the active system, a state of the redundant system at the time when the trouble occurs in the active system is equivalent to a state immediately before the occurrence of the trouble in the active system.

24 Claims, 16 Drawing Sheets

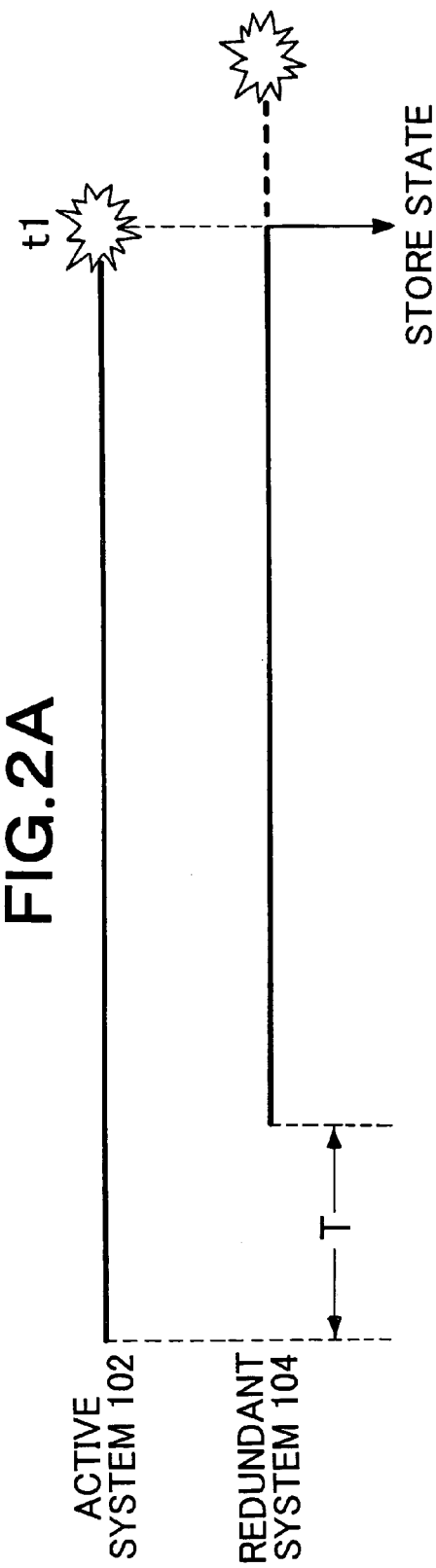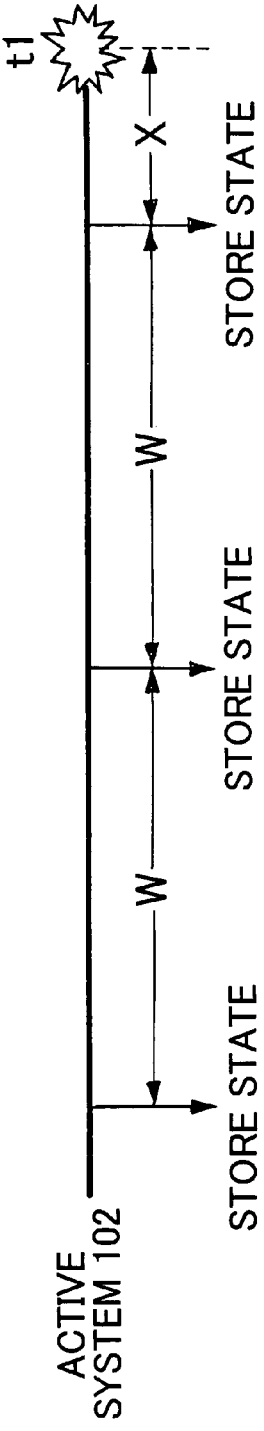

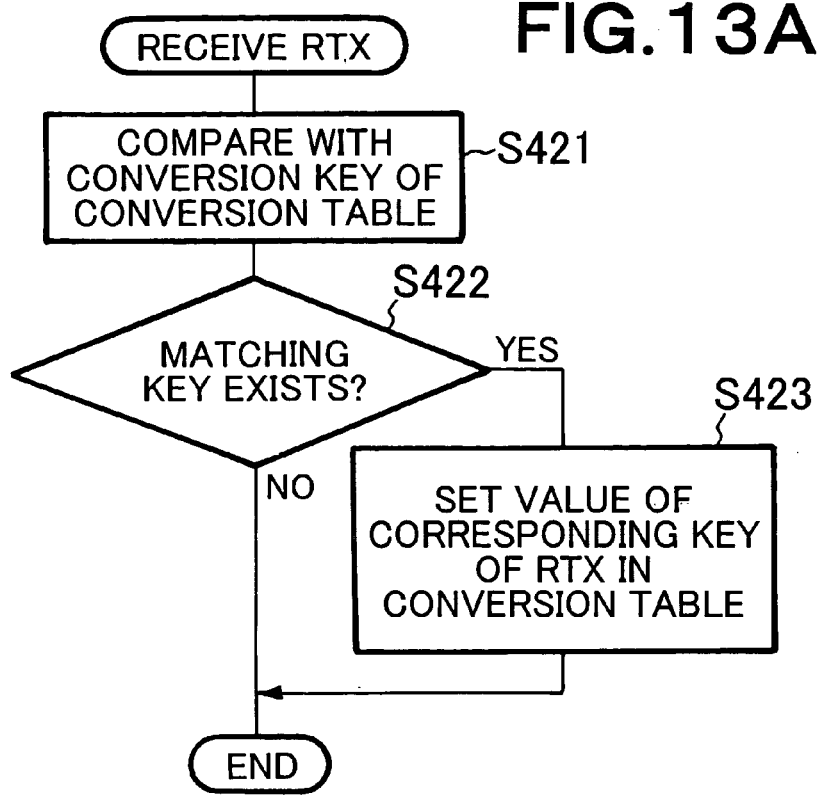
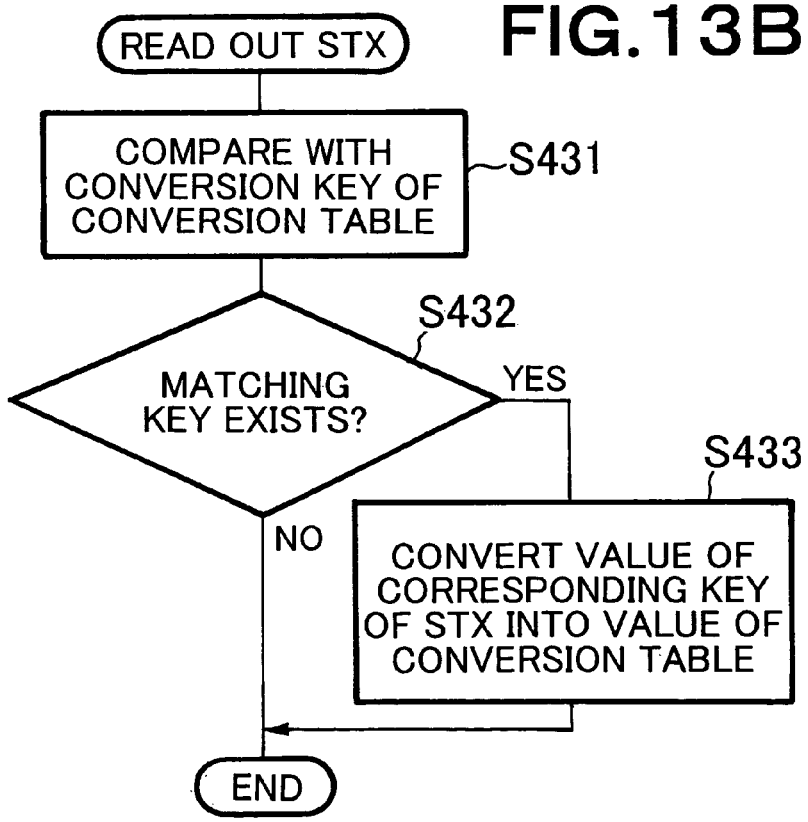

FIG.14

31: CONVERSION TABLE

| CONVERSION KEY | VALUE |
|---|---|
| SID | 30 |

COMPUTER SYSTEM INCLUDING ACTIVE SYSTEM AND REDUNDANT SYSTEM AND STATE ACQUISITION METHOD

BACKGROUND OF THE INVENTION

1. Field of the Invention

The present invention relates to a computer system, a state acquisition method, and a state acquisition program product, and in particular, to a computer system, a state acquisition method, and a state acquisition program product, having a function of storing a computer state immediately before occurrence of a trouble, for investigating causes of the trouble.

2. Description of the Related Art

In general, in methods for investigating the cause of a trouble in a computer, there are a method in which data necessary for analyzing the trouble, such as contents of a memory at the time of occurrence of the trouble, is stored in a file and the data is analyzed to investigate the cause of the trouble; and a method in which data necessary for reproducing the trouble, such as contents of a memory immediately before occurrence of the trouble, is stored in a file and the trouble is reproduced using the data to investigate the cause. In the former method, though it is relatively frequently used, there is a difficulty in reliability because processing for storing data must be performed in an unstable state after the occurrence of the trouble. Contrastingly, the latter method has no such problem because data is stored before the occurrence of the trouble.

JP-A-10-198578 discloses an example of the latter method. In the method disclosed in JP-A-10-198578, during a time period till some trouble occurs on a program being executed, the processor executing the program acquires and stores data for restart, called check points, at predetermined time intervals. As a result, at the time of occurrence of the trouble, data immediately before the occurrence of the trouble is stored.

As described above, in the conventional method of acquiring data necessary for reproducing the trouble, data is acquired and stored at predetermined time intervals during a time period till the trouble occurs. Therefore, there is a problem that overhead upon execution of the program increases and it brings about delay in normal program processing. In particular, the problem becomes remarkable as the amount of data to be stored increases, for example, when it is a huge amount of data including all images in the main memory, files on an external memory device used by the program, and so on.

SUMMARY OF THE INVENTION

An object of the present invention is to make it possible to acquire data indicating a state immediately before occurrence of a trouble, with little influence on normal program processing.

A first computer system of the present invention comprises an active system in which a program operates; a redundant system in which the same program as the above program operates with a delay in the same execution environment as the active system; and state storing means for storing a state of the redundant system when a trouble occurs in the active system.

A second computer system of the present invention comprises an active system in which a program operates; a redundant system in which the same program as the above program operates in the same execution environment as the active system; delay execution control means for giving the redundant system the same processing request as a processing request given to the active system, with a delay; trouble monitoring means for detecting presence/absence of a trouble of the active system; and state storage control means for storing, in a state data storing section, data indicating a state of the redundant system at the time when the trouble monitoring means detects a trouble of the active system.

A first state acquisition method of the present invention comprises executing the same program as a program that operates in an active system, with a delay in a redundant system having the same execution environment as the active system; and storing, in a state data storing section, data indicating a state of the redundant system at the time when a trouble occurs in the active system.

A second state acquisition method of the present invention comprises a first step of executing the same program as a program that operates in an active system, in parallel in a redundant system having the same execution environment as the active system; a second step of giving the redundant system the same processing request as a processing request given to the active system, with a delay; a third step of detecting presence/absence of a trouble of the active system; and a fourth step of storing, in a state data storing section, data indicating a state of the redundant system at the time when a trouble of the active system is detected.

A first state acquisition program product of the present invention causes a computer to function as delay execution control means for executing the same program as a program that operates in an active system, with a delay in a redundant system having the same execution environment as the active system; and state storing means for storing a state of the redundant system at the time when a trouble occurs in the active system.

A second state acquisition program product of the present invention causes a computer to function as delay execution control means for giving the same processing request as a processing request given to an active system in which a program operates, to a redundant system in which the same program as the above program operates in the same execution environment as the active system, with a delay; trouble monitoring means for detecting presence/absence of a trouble of the active system; and state storage control means for storing, in a state data storing section, data indicating a state of the redundant system at the time when the trouble monitoring means detects a trouble of the active system.

BRIEF DESCRIPTION OF THE DRAWINGS

FIG. 2 is a sequence chart for explaining an effect of the embodiment of the present invention;

FIG. 13 is a flowchart showing an example of processing by transaction conversion means in the second processing module in the transaction processing system according to Example 5 of the present invention;

FIG. 14 shows an example of contents of a conversion table in the transaction processing system according to Example 5 of the present invention;

DETAILED DESCRIPTION OF THE PREFERRED EMBODIMENTS

Next, the best mode for carrying out the present invention will be described in detail with reference to drawings.

Figure 1:
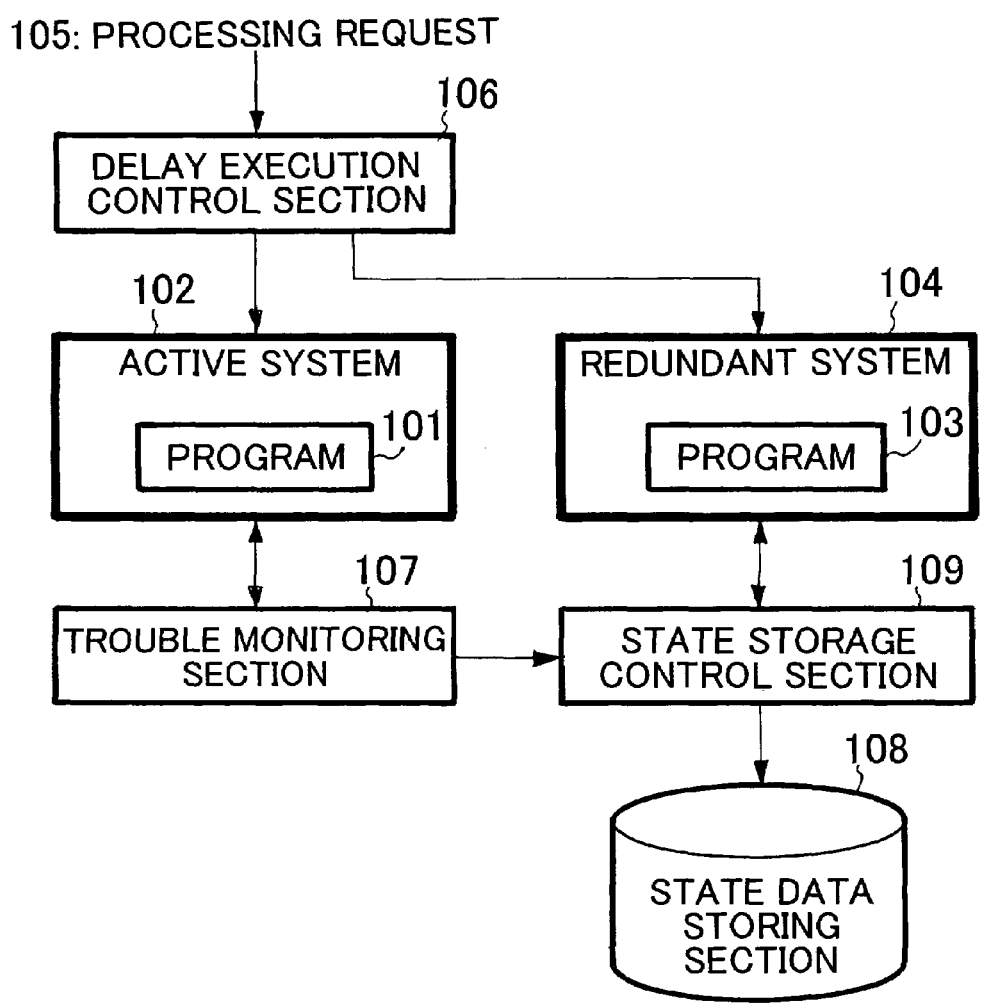
FIG. 1 is a block diagram of a computer system according to an embodiment of the present invention.

Referring to FIG. 1, a computer system according to an embodiment of the present invention includes an active system 102 in which a program 101 operates; a redundant system 104 in which the same program 103 as the program 101 operates in the same execution environment as the active system 102; a delay execution control section 106 for give the redundant system 104 the same processing request as a processing request 105 given to the active system 102, with a delay; a trouble monitoring section 107 for detecting presence/absence of a trouble of the active system 102; and a state storage control section 109 for storing, in a state data storing section 108, data indicating a state of the redundant system 104 when the trouble monitoring section 107 detects a trouble of the active system 102.

The active system 102 is made up of a certain computer, a certain server machine, and so on. The active system 102 performs a normal service in which the processing request 105 is processed to output processing results, by executing the program 101. The redundant system 102 executes the same program 103 as the program 101, which operates in the active system 102, in the same execution environment as the active system 102. Here, the same execution environment means that any of the hardware environment, the software environment, and the external connection device environment, such as the architecture of the processor, OS, the main memory capacity, and contents of files on an external memory device, is substantially the same.

The delay execution control section 106 gives the redundant system 104 the processing request 105 with a delay from the active system 102 so that the processing state of the redundant system 104 is delayed from the processing state of the active system 102. The degree of delay is arbitrary.

When the trouble monitoring section 107 detects occurrence of a trouble in the active system 102, the trouble monitoring section 107 notifies the state storage control section 109 of that effect. The method for detecting the trouble is arbitrary. Detection of a sign of a trouble is also included in the detection of the trouble mentioned here.

When the state storage control section 109 receives, from the trouble monitoring section 107, the notice that a trouble has occurred in the active system 102, the state storage control section 109 stops processing of the redundant system 104, collects data indicating the state of the redundant system 104, and stores it in the state data storing section 108. Because the redundant system 104 is delayed from the active system 102, the state of the redundant system 104 at the time when the trouble occurred in the active system 102 is equivalent to a state immediately before the trouble occurred in the active system 102. The data to be collected are data necessary for analyzing the cause of the trouble, or all data necessary for later reproducing the state at that time, such as the whole contents of the main memory device (main memory image), the contents of files on each external memory device, and the value of the register of the processor. If all data necessary for later reproducing the state at that time are to be collected, by using data stored in the state data storing section 108, the state of the redundant system 104 can be recovered to the same state any number of times. This makes it possible to reproduce the trouble by restarting processing of the redundant system 104 and investigate the cause of the trouble by the reproduction of the trouble.

The above-described delay execution control section 106, trouble monitoring section 107, and state storage control section 109 can be realized by a computer and a state acquisition program. The state acquisition program is provided in a form of being recorded on a computer readable record medium such as a magnetic disk, and read by the computer, for example, at the time of starting the computer. The state acquisition program controls the operation of the computer to realize each function means of the delay execution control section 106, the trouble monitoring section 107, and the state storage control section 109 on the computer.

FIG. 2 shows an effect of this embodiment. As shown in FIG. 2A, according to this embodiment, the redundant system 104 changes in its state with a delay from the active system 102 by a delay quantity T. When a trouble occurs in the active system 102 at a certain time t1, if the redundant system 104 is not stopped, the same trouble occurs after the time elapses by the delay quantity T. This is because the redundant system 104 is executing the same program 103 as the program 101 operating in the active system 102, in the same execution environment as the active system 102. Therefore, the state of the redundant system 104 at the time t1 is equivalent to the state of the active system 102 at the time before the time when the trouble occurred, by the delay quantity T.

FIG. 2B shows a sequence in case that the method disclosed in JP-A-10-198578 is applied and states of the active system 102 are stored at predetermined time intervals W in a time period till a trouble occurs. Because the active system 102 must be periodically stopped for storing the state, there is a very large influence on the normal service. In addition, the time difference x between the time t1 when the trouble occurred, and the state storage time immediately before the time t1, is unfixed, where it is impossible to always store the state before the time t1 by the delay quantity T as in this embodiment.

According to this embodiment, the state immediately before the occurrence of the trouble can be acquired with little influence on normal program processing. The reasons are as follows. Because the same program as the program operating in the active system is operated with a delay in the redundant system having the same execution environment as the active system, the state of the redundant system at the time when the trouble occurred in the active system is equivalent to a state immediately before the occurrence of the trouble in the active system. In addition, periodic storage operations for the state of the active system as disclosed in JP-A-10-198578 are unnecessary.

Next, examples of the present invention will be described in detail with reference to drawings.

EXAMPLE 1

Figure 3:
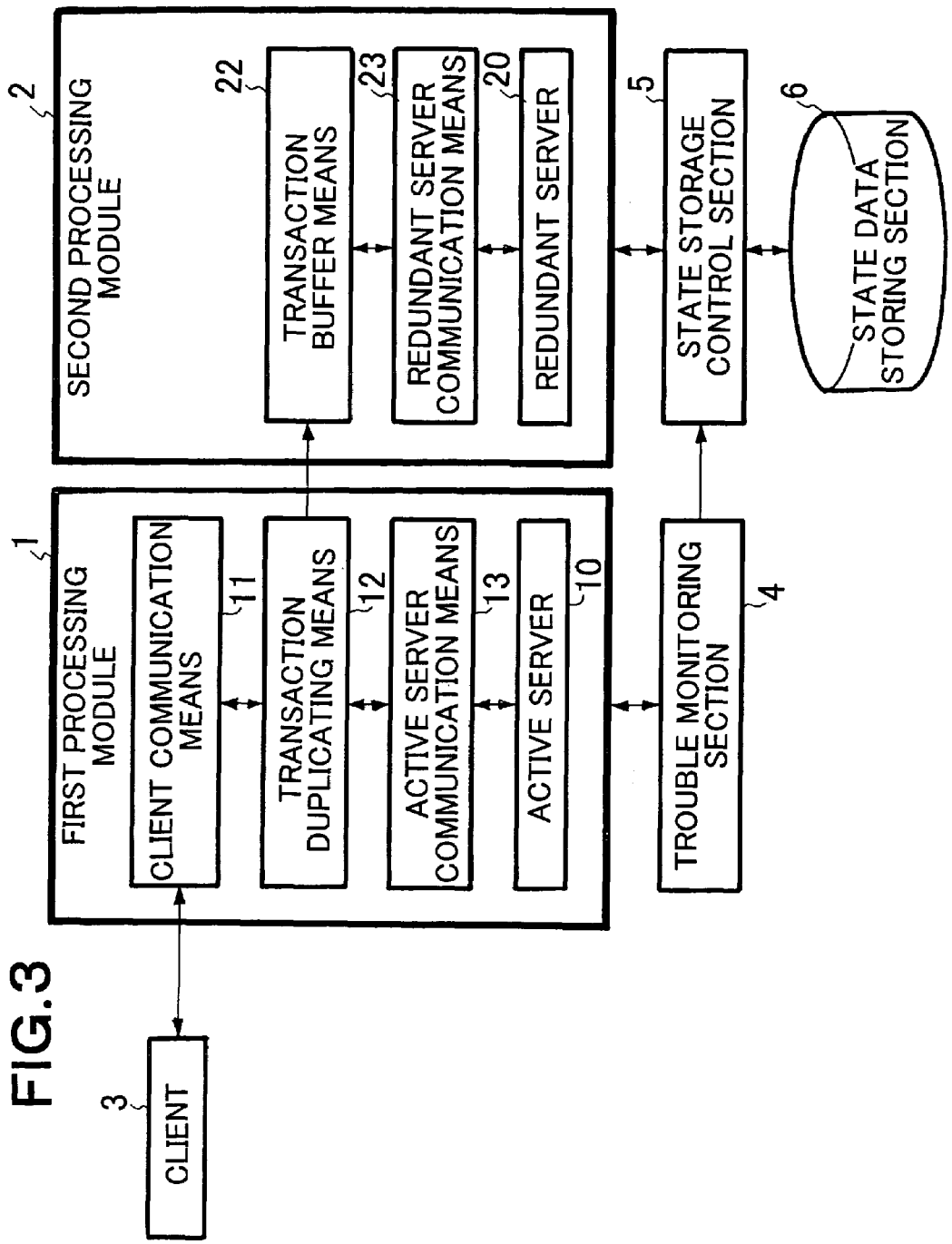
FIG. 3 is a block diagram of a transaction processing system according to Example 1 of the present invention.

Referring to FIG. 3, a computer system according to Example 1 of the present invention is a transaction processing system, which is made up of a first processing module 1 and a second processing module 2, each constituted by a data processing machine (a computer, a central processing unit, and a processor) operating under program control; a client 3; a trouble monitoring section 4; a state storage control section 5; and a state data storing section 6. The first processing module 1 includes an active server 10, client communication means 11, transaction duplicating means 12, and an active server communication means 13. The second processing module 2 includes a redundant server 20, transaction buffer means 22, and redundant server communication means 23. In relation to FIG. 1, the active server 10 and the redundant server 20 correspond to the active system 102 and the redundant system 104, respectively. The redundant server 20 executes the same transaction processing program as a transaction processing program operating in the active server 10, in the same execution environment as the active server 10.

Each of the above means generally operates as follows.

In the first processing means, the client communication means 11 performs communication processing with the client 3, receives a processing request, and transmits processing results. The transaction duplicating means 12 receives the processing request received by the client communication means 11, makes a duplication, and transmits the duplication to the second processing module 2. The original of the processing request is given to the active server communication means 13. The active server 10 performs transaction processing in which the active server 10 receives the processing request from the active server communication means 13, processes the received processing request, and transmits the processing results to the active server communication means 13. The processing results are further transmitted to the client 3 through the transaction duplicating means 12 and the client communication means 11.

In the second processing module 2, the transaction buffer means 22 temporarily stores the duplication of the processing request received from the first processing module 1. The redundant server communication means 23 read out the processing request temporarily stored, and transmits it to the redundant server 20. The redundant server 20 performs transaction processing in which the redundant server 20 receives the processing request from the redundant server communication means 23, processes the received processing request, and transmits the processing results to the redundant server communication means 23, though the processing results are not transmitted to the client 3.

The client 3 transmits a transaction processing request to the first processing module 1 and receives the processing results from the first processing module 1.

The trouble monitoring section 4 monitors the processing state of the first processing module 1. When there is abnormality in processing, the trouble monitoring section 4 detects occurrence of a trouble and notifies the state storage control section 5.

The state storage control section 5 controls the processing state of the second processing module 2. When the state storage control section 5 receives the notice from the trouble monitoring section 4 indicating the occurrence of the trouble, the state storage control section 5 stores, in the state data storing section 6, data of the processing state of the whole of the second processing module 2 including the redundant server 20.

Figure 4:
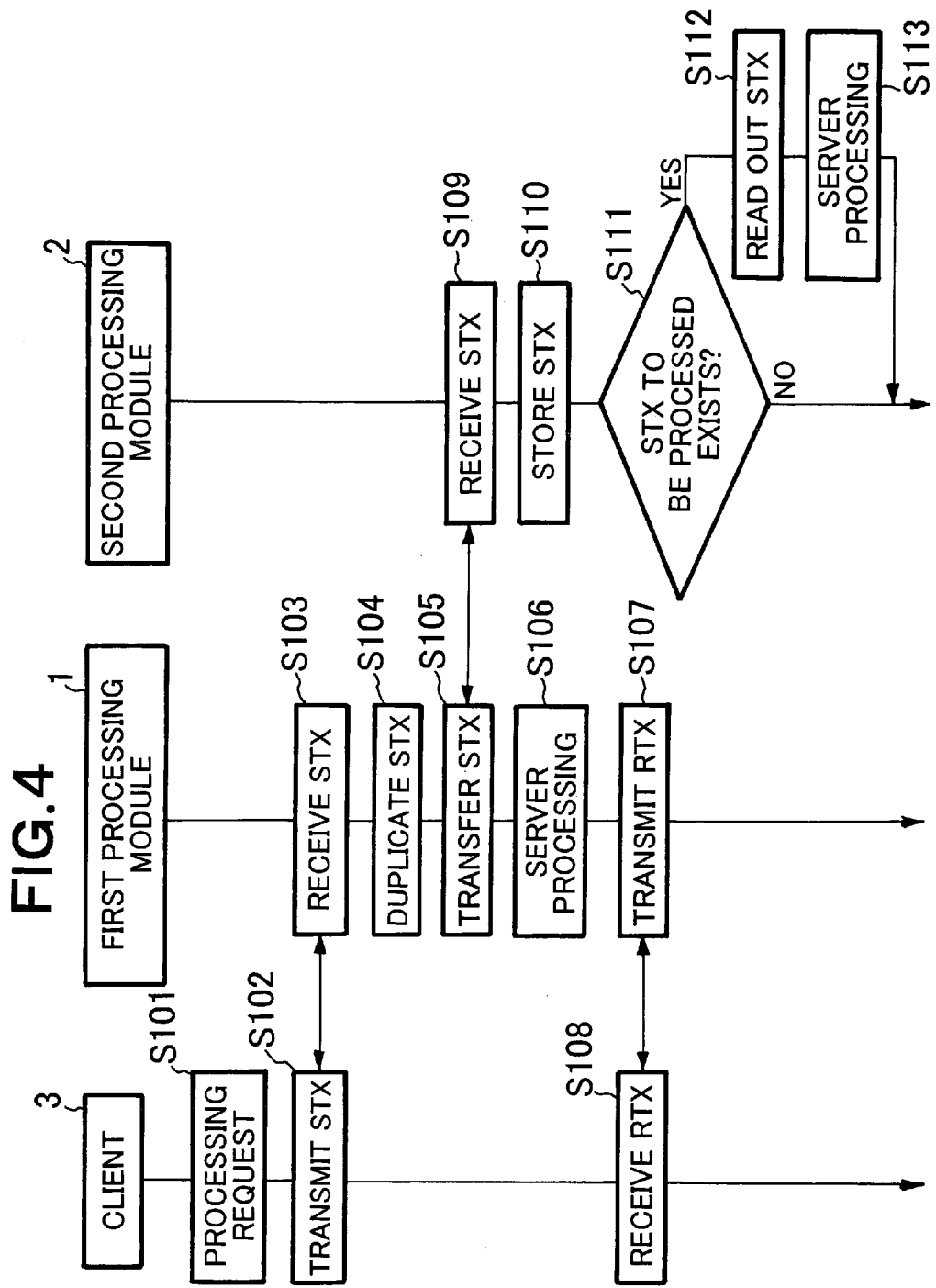
FIG. 4 is a flowchart showing an operation when no trouble occurs in the transaction processing system according to Example 1 of the present invention.
Figure 5:
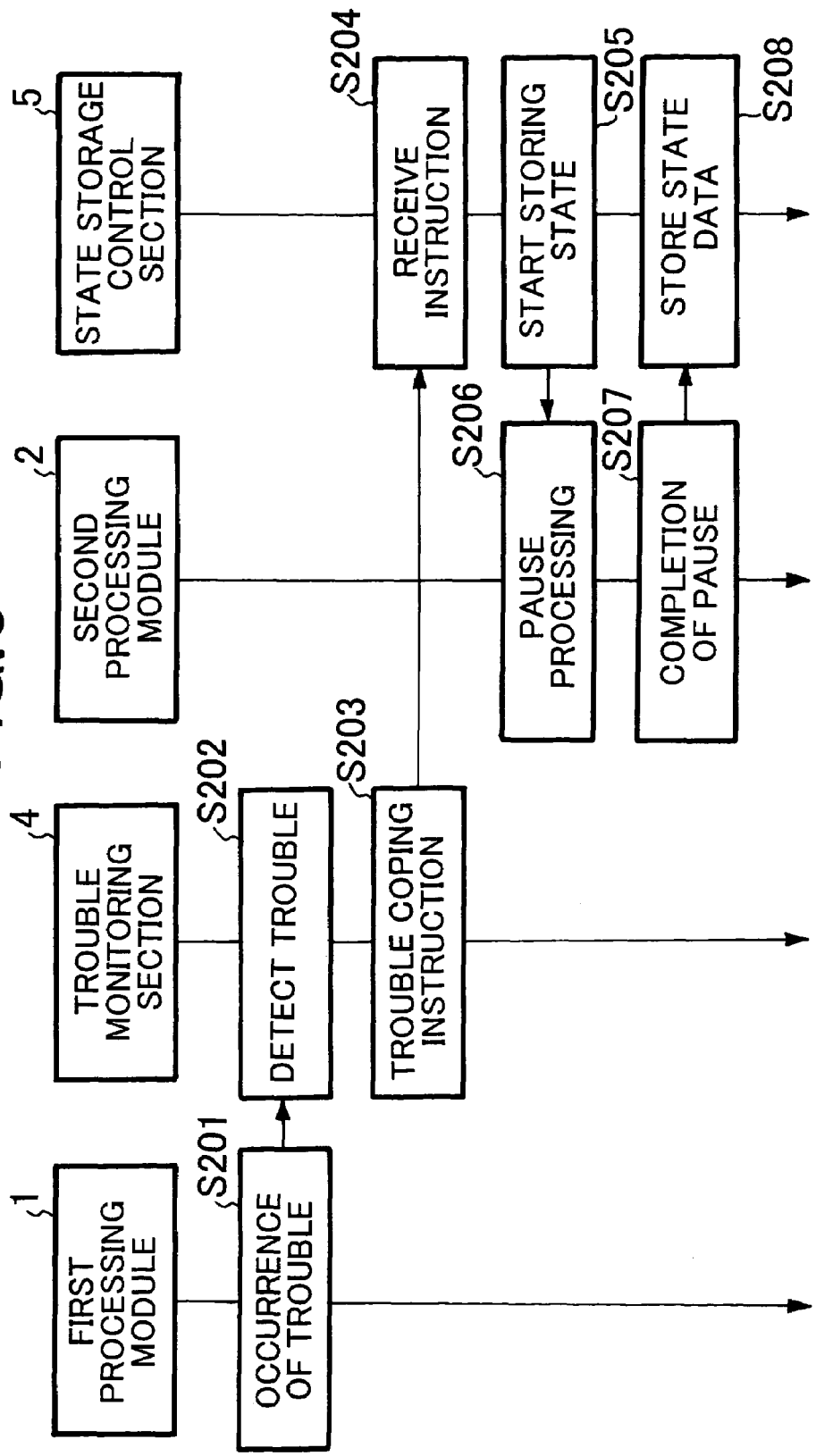
FIG. 5 is a flowchart showing an operation when a trouble occurs in the transaction processing system according to Example 1 of the present invention.

Next, operations of Example 1 will be described with reference to the block diagram of FIG. 3 and the flowcharts of FIGS. 4 and 5.

First, an operation of this example when no trouble occurs will be described. In the client 3, when a transaction processing request is generated (S101 in FIG. 4), the processing request (STX) is transmitted to the first processing module 1 (S102). In the first processing module 1, the client communication means 11 receives the processing request (S103), and the transaction duplicating means 12 makes a duplication of the processing request (S104) and transfers the duplication of the processing request to the second processing module 2 (S105). The original of the processing request is transmitted to the active server 10 through the active server communication means 13 and processed therein (S106). Processing results (RTX) obtained in the active server 10 are transmitted to the client 3 through the active server communication means 13, the transaction duplicating means 12, and the client communication means 11 (S107). The client 3 receives the processing results (S108).

In the second processing module 2, the transaction buffer means 22 receives the duplicate of the processing request (S109) and then temporarily stores it (S110). The redundant server communication means 23 periodically checks whether or not a processing request to be processed exists in the transaction buffer means 22 (S111). If a processing request to be processed exists, the redundant server communication means 23 reads out the processing request (S112) and transmits it to the redundant server 20, where the processing request is processed (S113).

Next, an operation of this example when a trouble occurs will be described. If a trouble occurs in the active server 10 of the first processing module 1 (S201 in FIG. 5), the trouble monitoring section 4 detects the occurrence of the trouble (S202). The technique for detecting the trouble may be realized as follows. For example, a heartbeat signal is communicated with the active server 10 of the first processing module 1 and the trouble is detected by presence/absence of the response. Otherwise, the processing quantity of the processor constituting the active server 10 or the communication quantity of input/output is remotely monitored and the trouble is detected by abnormality therein. Further, a service processor may be used for this purpose. Thus, various techniques can be used.

When the trouble monitoring section 4 detects the trouble, the trouble monitoring section 4 sends a trouble coping instruction to the state storage control section 5 (S203). When the state storage control section 5 receives the instruction (S204), the state storage control section 5 starts processing for storing a state (S205). First, the state storage control section 5 controls the second processing module 2 to temporarily stop processing (S206). When processing of the second processing module 2 is completely stopped (S207), the state storage control section 5 collects state data and stores it in the state data storing section 6 (S208). The state data contains the states of the internal memory, the external memory, the register of the processor, and each device if it is used. If a write-in cache such as a cache in the processor or a disk cache is effective, storing the state data is performed after update processing of data of the cache is performed to reflect it on the internal and external memories.

As described above, in Example 1, the redundant processing system is prepared separately from the active processing system. In the redundant processing system, each processing request is temporarily stored and then processed with a delay. Thereby, after a trouble in the active system is detected, a processing state of the redundant state is stored before the trouble appears in the redundant system. Thus, a processing state of the computer before the trouble appears can surely be stored.

According to this example, because the redundant system is executed with a delay from the active system by giving the redundant system the same processing request as a processing request given to the active system, with a delay, in a computer system in which processing proceeds in a unit of a processing request, such as a transaction processing system, a state immediately before occurrence of a trouble can be acquired with little influence on normal program processing.

In addition to the above effect, the redundant system can be delayed from the active system by a very short time period necessary for temporarily storing a processing request and reading out it, and a state before occurrence of a trouble in the active system by the above time period can be stored.

EXAMPLE 2

Figure 6:
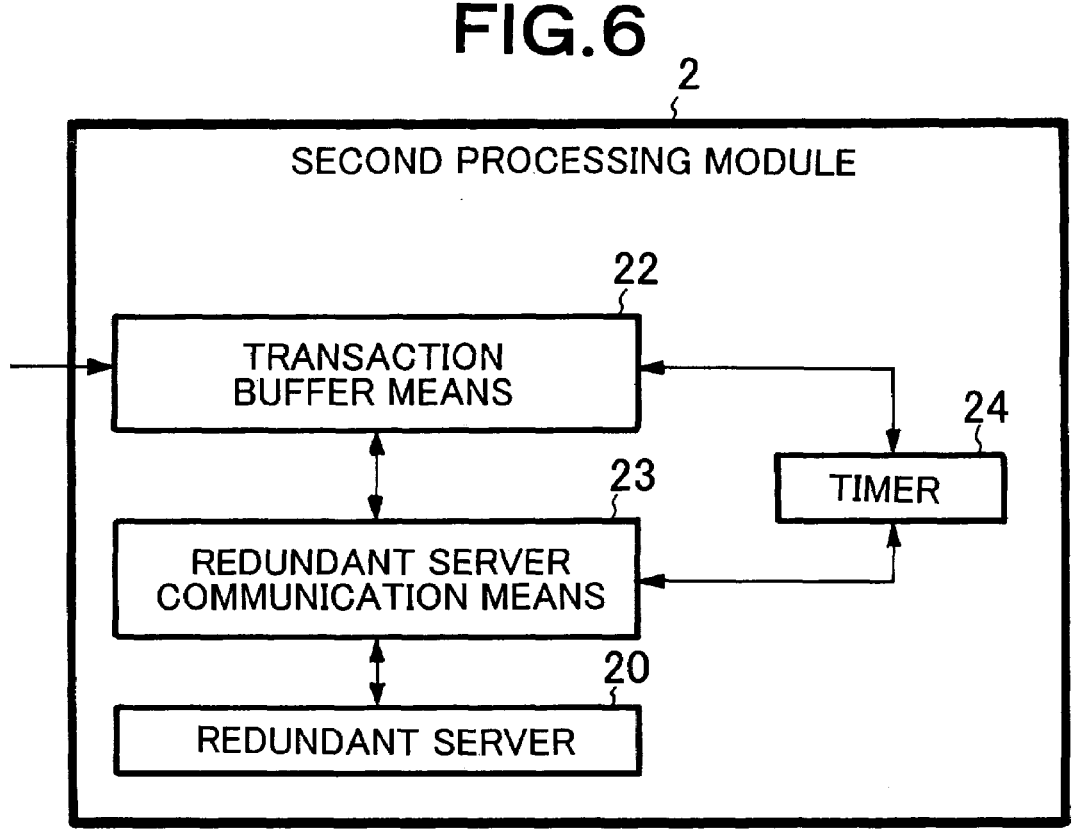
FIG. 6 is a block diagram of a second processing module in a transaction processing system according to Example 2 of the present invention.

Referring to FIG. 6, a transaction processing system according to Example 2 differs in constitution from Example 1 on the point that a timer 24 is added to the second processing module 2 in the transaction processing system according to Example 1. The timer 24 has a function of holding the value of the current time or the time elapsed from a certain time, and returning the value in response to a request from the transaction buffer means 22 and the redundant server communication means 23.

Figure 7:
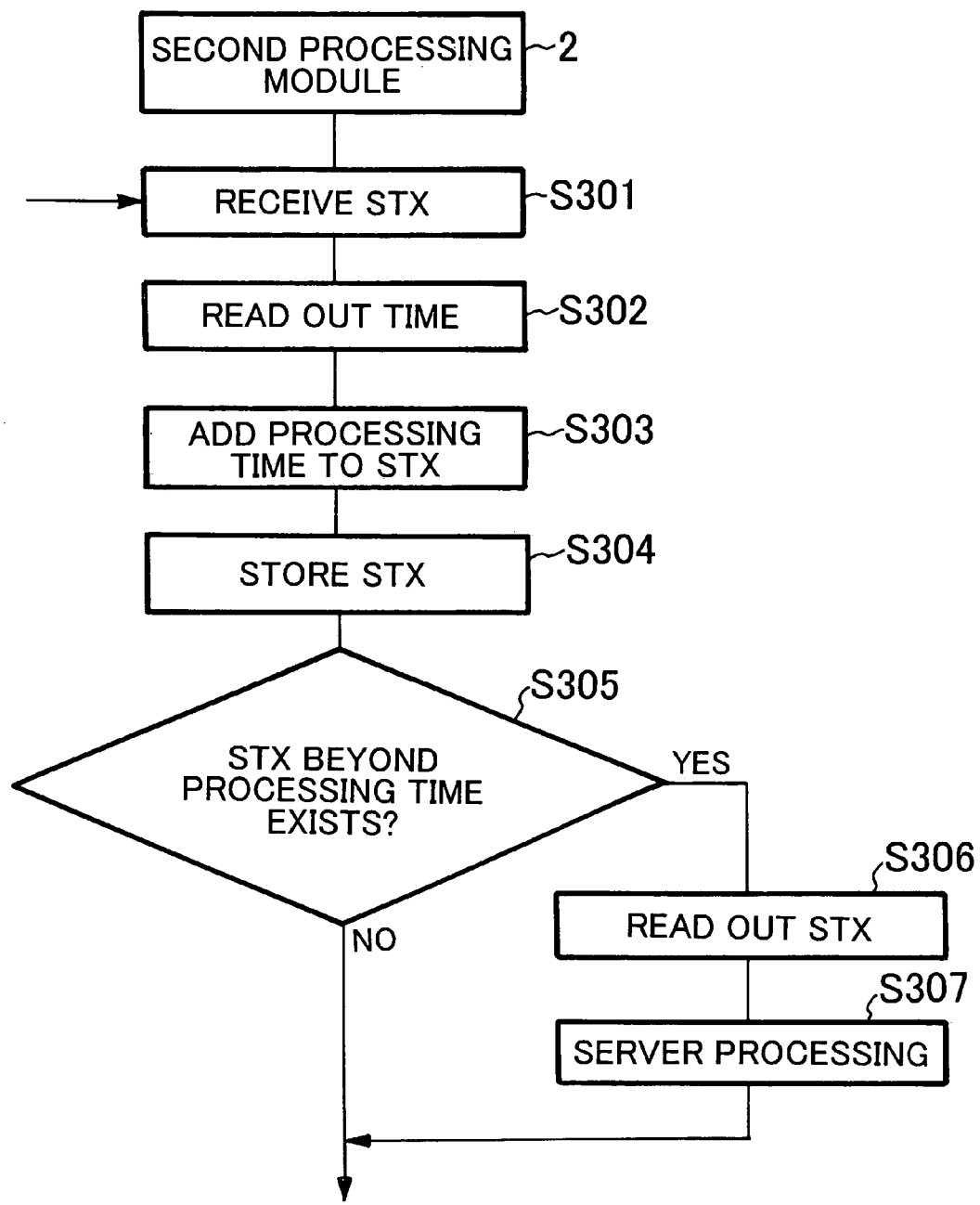
FIG. 7 is a flowchart showing an example of processing in the second processing module in the transaction processing system according to Example 2 of the present invention.

Next, an operation of Example 2 will be described with reference to the block diagram of FIG. 6 and the flowchart of FIG. 7 with laying stress on the different point from Example 1. The difference of the operation of Example 2 from the operation of Example 1 is only in the part of the operation of the second processing module 2 when no trouble occurs. As for S101 to S108 of FIG. 4 and S201 to S208 of FIG. 5 of Example 1, the same operations are performed also in this example. In place of the operation in and after S109 of FIG. 4, the operation in and after S301 of FIG. 7 is performed in this example. This will be described in detail.

In the second processing module 2, when the transaction buffer means 22 receives the duplication of a processing request from the first processing module 1 (S301), the transaction buffer means 22 read out the current time from the timer 24 (S302), adds, to the processing request, the time that a predetermined delay time is added to the current time, as a processing time (S303), and stored it in a buffer (S304). For example, when the predetermined delay time is one minute, the time that one minute is added to the current time is given as the processing time and stored.

The redundant server communication means 23 periodically checks whether or not a processing request exists in the transaction buffer means 22, and if a request exists, whether or not the processing time added to the processing request is beyond the current time indicated by the timer 24 (S305). If a processing request exists having the processing time beyond the current time, redundant server communication means 23 reads out the processing request (S306), and transmits it to the redundant server 20, where the processing request is processed (S307).

As described above, in Example 2, the redundant processing system is prepared separately from the active processing system. In the redundant processing system, each processing request is temporarily stored and then processed with a delay of a predetermined time. Thereby, after a trouble in the active system is detected, a processing state of the redundant state is stored before the trouble appears in the redundant system. Thus, a processing state of the computer before the trouble appears can surely be stored.

According to this example, the redundant system can be delayed from the active system by at least a predetermined time period, and a state before occurrence of a trouble in the active system by the predetermined time period can be stored.

EXAMPLE 3

Figure 8:
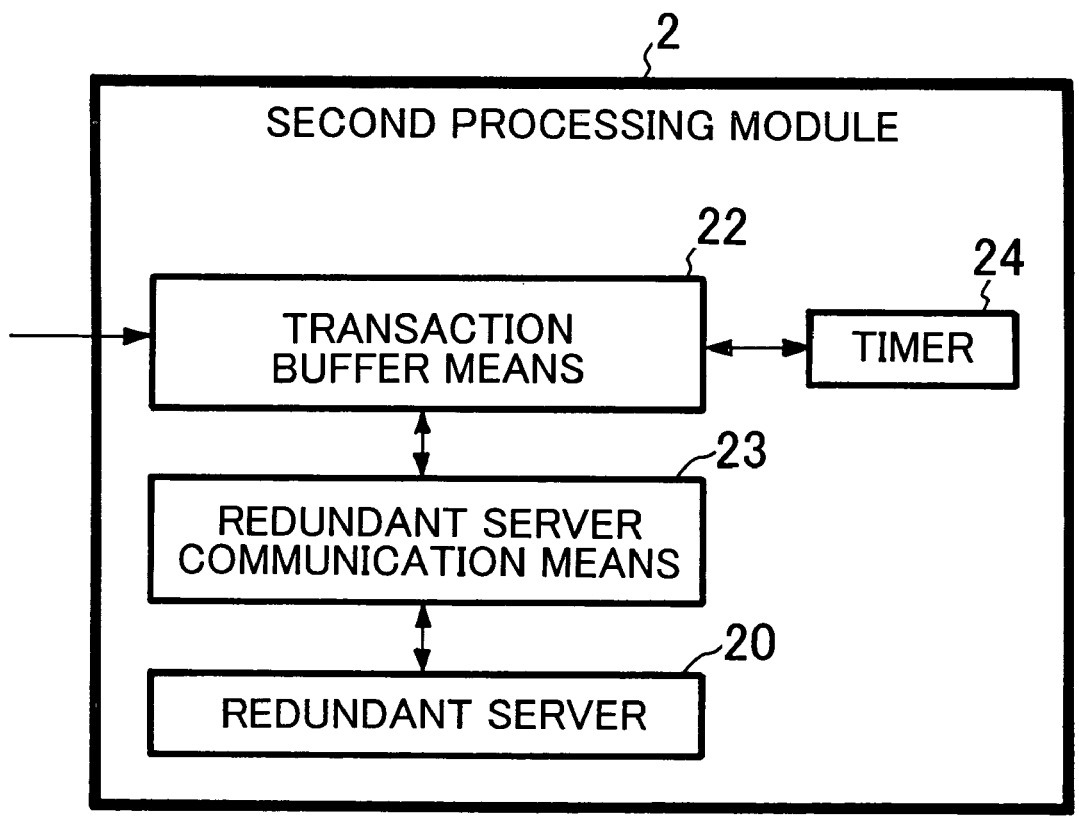
FIG. 8 is a block diagram of a second processing module in a transaction processing system according to Example 3 of the present invention.

Referring to FIG. 8, a transaction processing system according to Example 3 differs in constitution from Example 1 on the point that a timer 24 is added to the second processing module 2 in the transaction processing system according to Example 1. The timer 24 has a function of holding the value of the current time or the time elapsed from a certain time, and returning the value in response to a request from the transaction buffer means 22.

Figure 9:
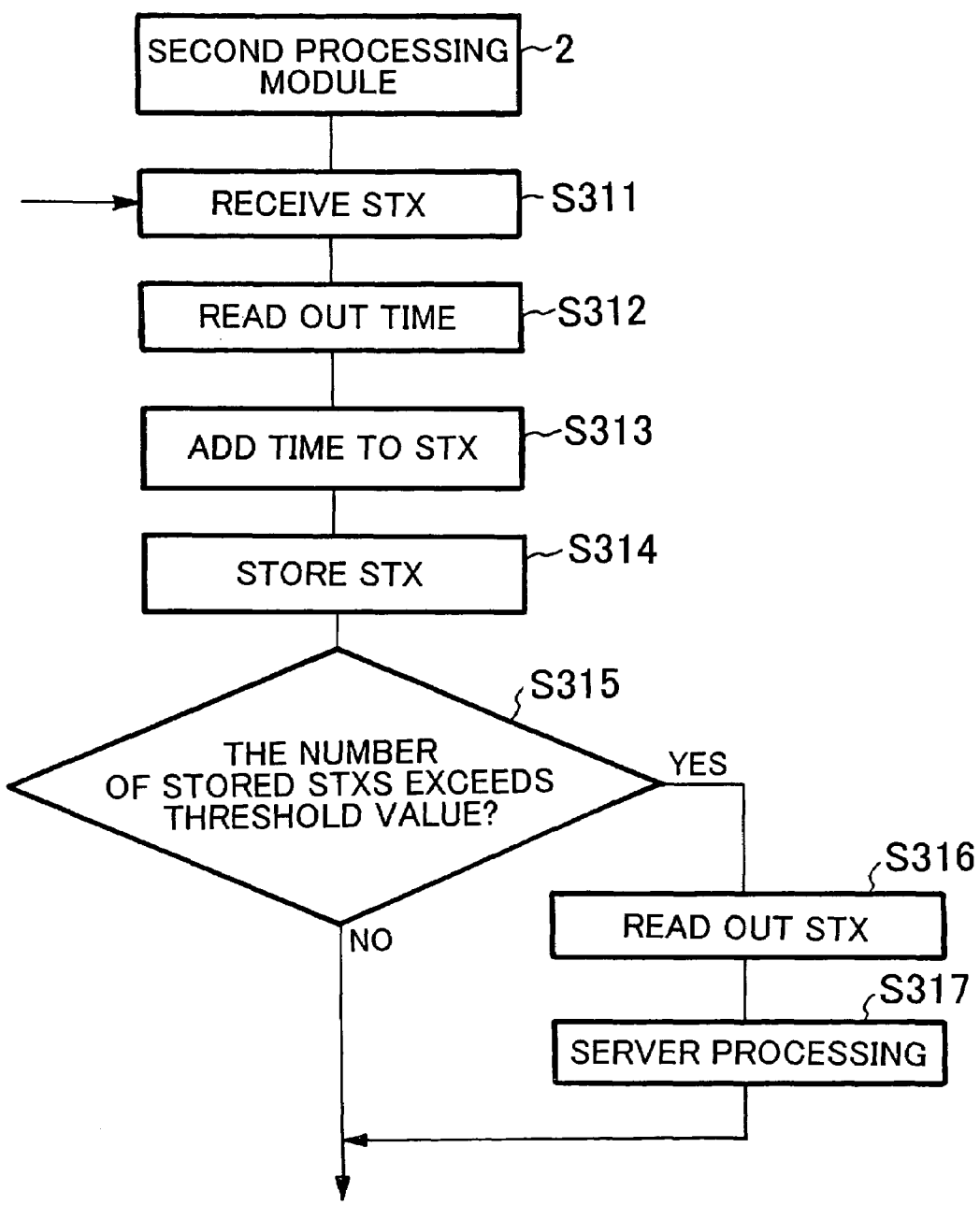
FIG. 9 is a flowchart showing an example of processing in the second processing module in the transaction processing system according to Example 3 of the present invention.

Next, an operation of Example 3 will be described with reference to the block diagram of FIG. 8 and the flowchart of FIG. 9 with laying stress on the different point from Example 1. The difference of the operation of Example 3 from the operation of Example 1 is only in the part of the operation of the second processing module 2 when no trouble occurs. As for S101 to S108 of FIG. 4 and S201 to S208 of FIG. 5 of Example 1, the same operations are performed also in this example. In place of the operation in and after S109 of FIG. 4, the operation in and after S311 of FIG. 9 is performed in this example. This will be described in detail.

In the second processing module 2, when the transaction buffer means 22 receives the duplication of a processing request from the first processing module 1 (S311), the transaction buffer means 22 read out the current time from the timer 24 (S312), adds the current time to the processing request (S313), and stored it in a buffer (S314).

The redundant server communication means 23 periodically checks whether or not the number of processing requests stored in the transaction buffer means 22 exceeds a predetermined threshold value (S315). If the number of existing processing requests exceeds the threshold value, the redundant server communication means 23 reads out the oldest processing request of them, that is, the processing request having the oldest added time (S316), and transmits it to the redundant server 20, where the processing request is processed (S317).

As described above, in Example 3, the redundant processing system is prepared separately from the active processing system. In the redundant processing system, each processing request is temporarily stored and then processed with a delay of a predetermined number of transactions. Thereby, after a trouble in the active system is detected, a processing state of the redundant state is stored before the trouble appears in the redundant system. Thus, a processing state of the computer before the trouble appears can surely be stored.

In a combination of Examples 2 and 3, there is thinkable the following example. If the number of processing requests stored in the transaction buffer means 22 exceeds the threshold value, the oldest processing request is read out and transmitted to the redundant server. If the number of processing requests does not exceed the threshold value, it is checked whether or not the processing time of the oldest processing request is beyond the current time. If the processing time is beyond the current time, the processing request is read out and transmitted to the redundant server.

According to this example, the redundant system can be delayed from the active system by the time period corresponding to the predetermined number of processing requests, and a state before occurrence of a trouble in the active system by the time period corresponding to the predetermined number of processing requests can be stored.

EXAMPLE 4

Figure 10:
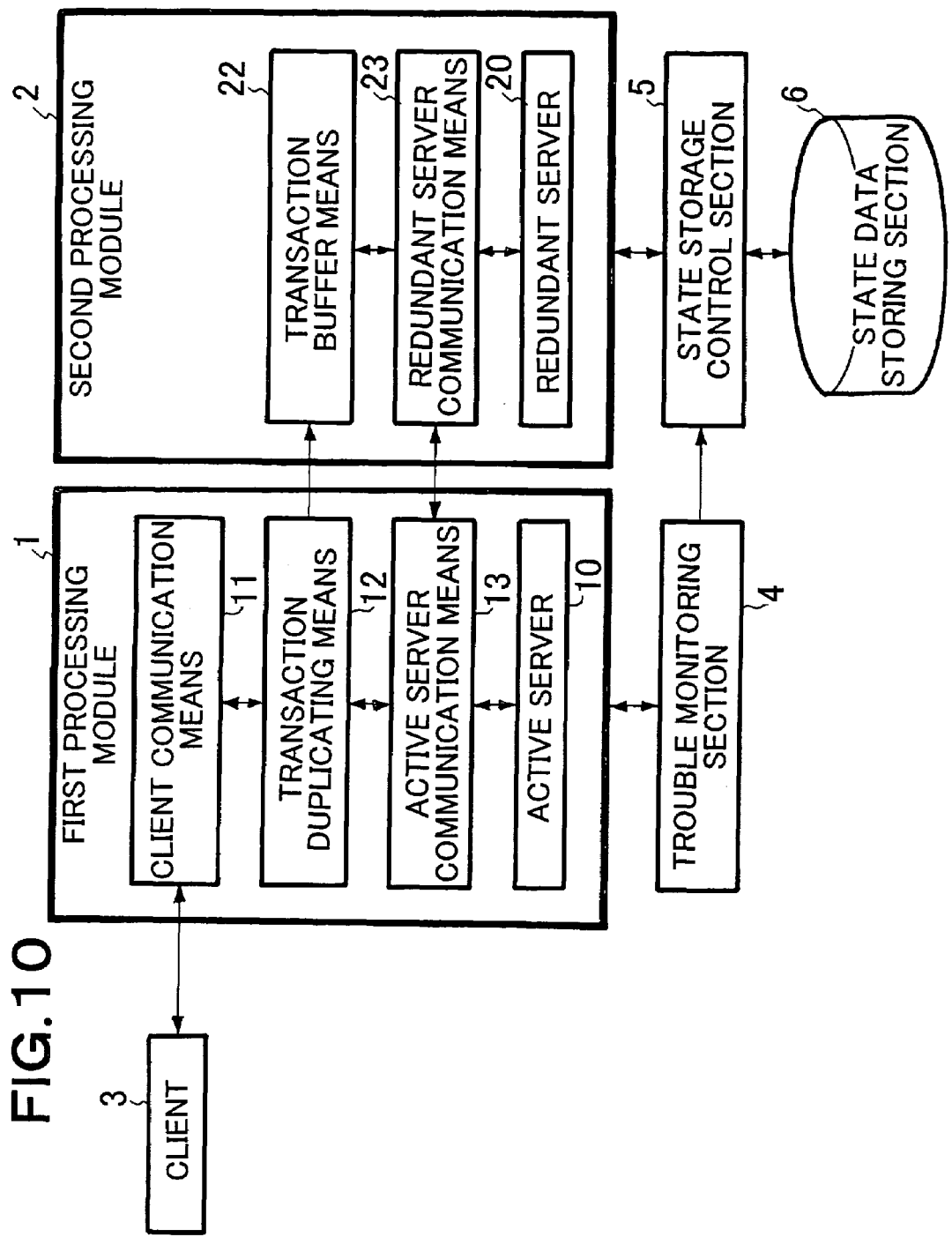
FIG. 10 is a block diagram of a transaction processing system according to Example 4 of the present invention.

Referring to FIG. 10, a transaction processing system according to Example 4 differs from Example 1 on the point that the transaction processing system according to Example 4 has a constitution for the active server communication means 13 and the redundant server communication means 23 communicating with each other.

Figure 11:
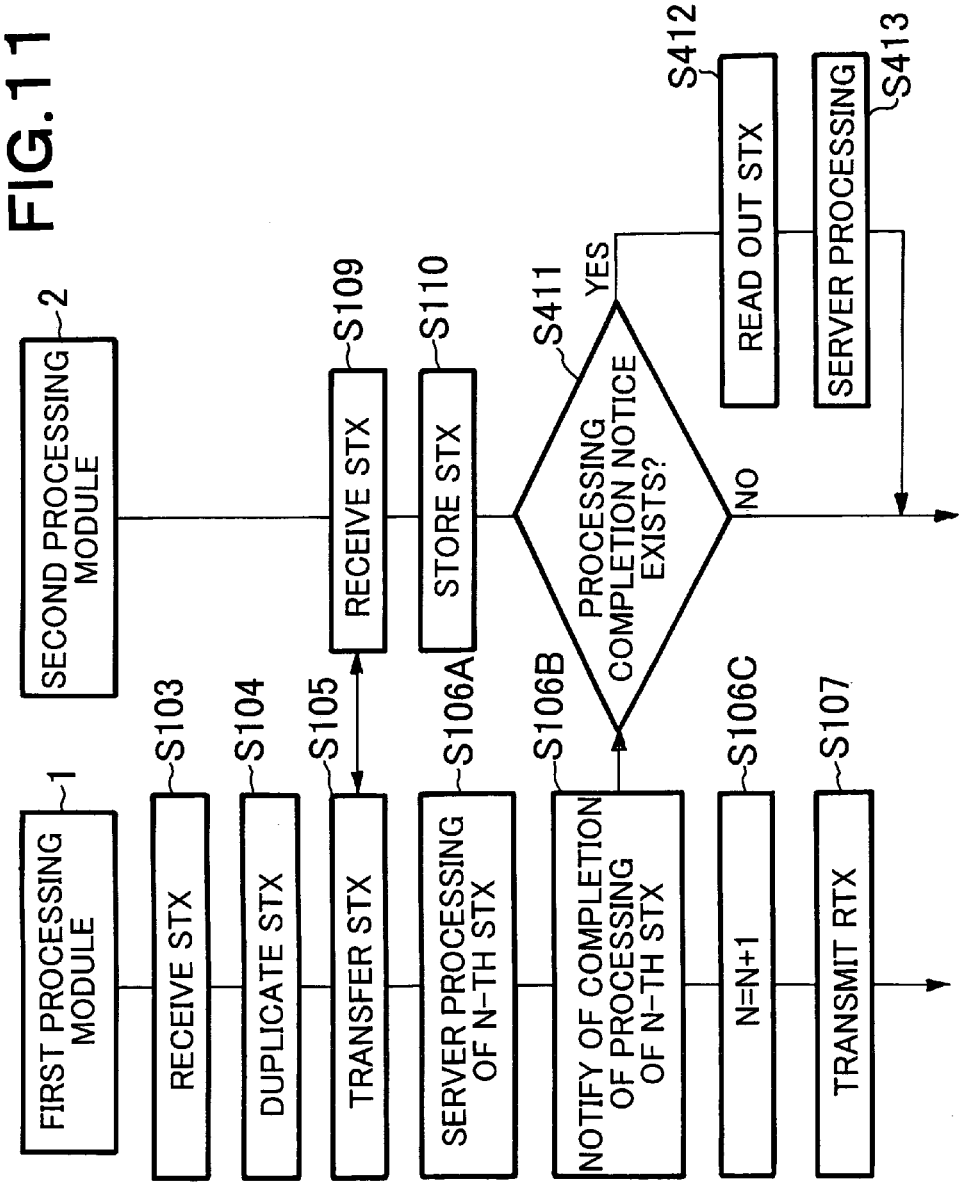
FIG. 11 is a flowchart showing an operation when no trouble occurs in the transaction processing system according to Example 4 of the present invention.

Next, an operation of Example 4 will be described with reference to the block diagram of FIG. 10 and the flowchart of FIG. 11 with laying stress on the different point from Example 1. The difference of the operation of Example 4 from the operation of Example 1 is only in the part of the operations of the first and second processing modules 1 and 2 when no trouble occurs. As for processing of S101 to S105 and S107 to S110 of FIG. 4 of Example 1, the same operations are performed also in this example. In place of processing of S106 and S111 to S113 of FIG. 4, processing of S106A to S106C and S411 to S413 of FIG. 11 is performed in this example. This will be described in detail.

The active server communication means 13 of the first processing module 1 gives each processing request a serial number N to be processed by the active server 10 (S106A). When processing results to the processing request of the serial number N is returned from the active server 10, the active server communication means 13 transmits a notice indicating completion of the processing request of the serial number N to the redundant server communication means 23 (S106B). The active server communication means 13 adds one to N (S106C), performs processing of the step S107, and continues processing repeatedly.

The redundant server communication means 23 of the second processing module 2 receives the processing completion notice from the active server communication means 13 of the first processing module 1 (S411). If it is the N-th processing completion notice, the redundant server communication means 23 reads out, from the transaction buffer means 22, the processing request stored at the N-th time (S412), and transmits it to the redundant server 20, where the processing request is processed (S413).

As described above, in Example 4, the redundant processing system is prepared separately from the active processing system. In the redundant processing system, each processing request is temporarily stored and then processed after confirmation of completion of processing in the active system. Thereby, after a trouble in the active system is detected, a processing state of the redundant state is stored before the trouble appears in the redundant system. Thus, a processing state of the computer before the trouble appears can surely be stored.

According to this example, the redundant system can be delayed from the active system by the time period in which one processing request is processed in the active system, and a state before occurrence of a trouble in the active system by the time period corresponding to one processing request.

EXAMPLE 5

Figure 12:
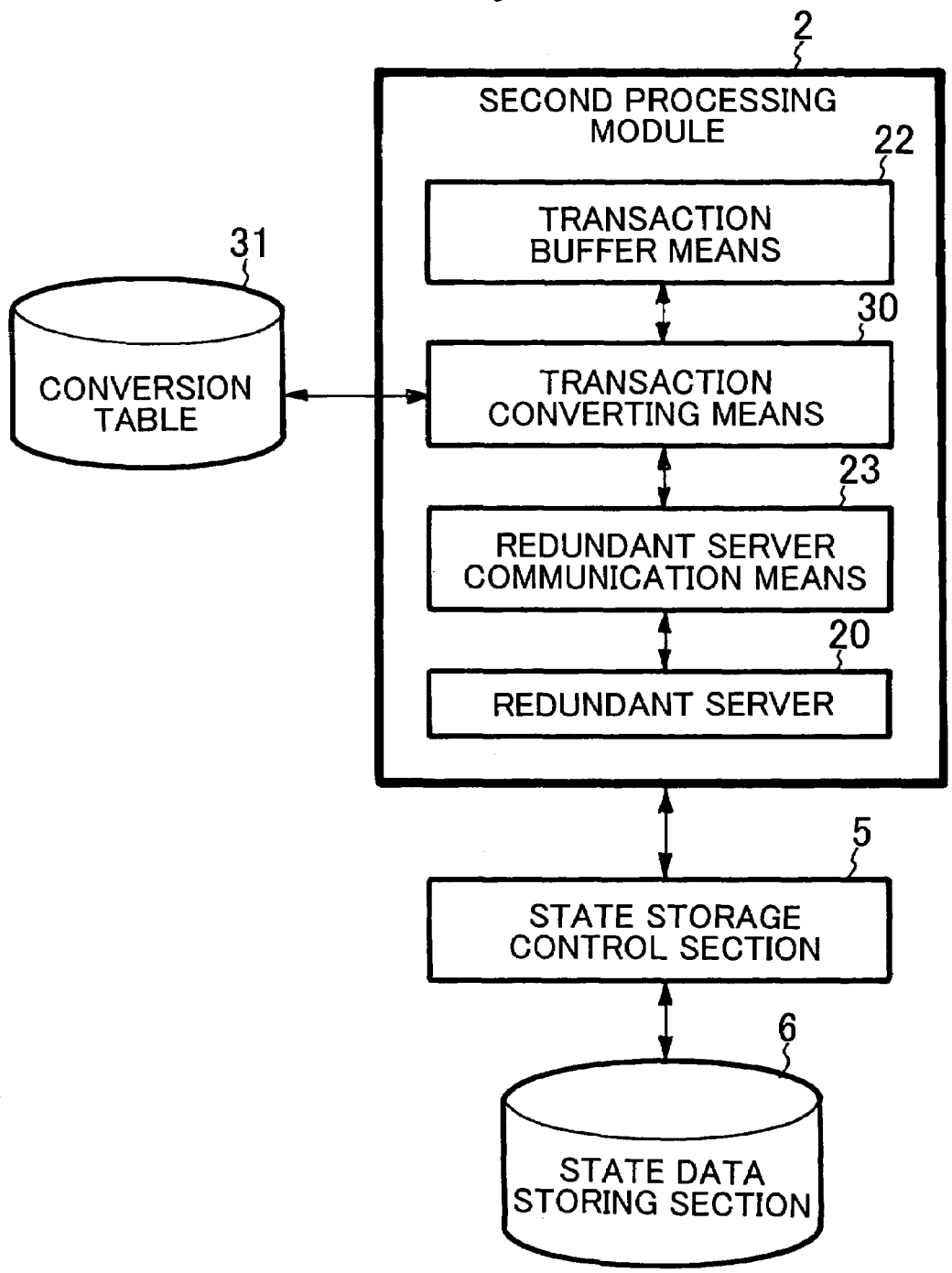
FIG. 12 is a block diagram of a second processing module in a transaction processing system according to Example 5 of the present invention.

Referring to FIG. 12, a transaction processing system according to Example 5 differs from Example 1 on the point that a transaction converting means 30 and a conversion table 31 are provided in the second processing module 2 in the transaction processing system according to Example 1.

The transaction converting means 30 is disposed between the transaction buffer means 22 and the redundant server communication means 23. The transaction converting means 30 has a function of setting a value after conversion of a predetermined parameter in the conversion table 31, and a function of converting the value of a predetermined parameter included in a processing request into the converted value set in the conversion table when the processing request stored in the transaction buffer means 22 is transferred to the redundant server 23. The conversion table 31 is a table holding a set of a conversion key for uniquely defining a predetermined parameter and the converted value.

FIG. 13 shows an example of processing or the transaction converting means 30. If the transaction converting means 30 is called out when the redundant server communication means 23 receives processing results (RXT) from the redundant server 20, the transaction converting means 30 starts processing of FIG. 13A and checks whether or not a key matching a conversion key set in the conversion table 31 exists in the processing results (S421). If a matching key exists (S422), the transaction converting means 30 sets the value of the key existing in the processing results in the conversion table 31 (S423). On the other hand, if the transaction converting means 30 is called out when the redundant server communication means 23 reads out a processing request (STX) from the transaction buffer means 22, the transaction converting means 30 starts processing of FIG. 13B and checks whether or not a key matching a conversion key set in the conversion table 31 exists in the processing request (S431). If a matching key exists (S432), the transaction converting means 30 converts the value of the key existing in the processing request into the value set in the conversion table 31 (S433).

In this example, as a representative parameter to be converted with the conversion table 31, there is a session ID (SID). The session ID is an ID issued by a web server to a client in order that the web server can recognize a series of accesses by one user as one session. In case of the present invention, assuming that the value of a session ID generated in the active server is, for example, "20", this is sent to the client 3, and in a series of accesses, this value "20" of the session ID is contained in the next and later processing requests from the client 3. In case of the active server 10, because the next and later processing requests contain the value "20" of the session ID generated by the active server 10 itself, the active server 10 can recognize them as a series of accesses by the same user. However, in case of the redundant server 20, because the value of the session ID generated by the redundant server 20 itself is not always the same as that of the active server 10, if no measure is taken, session management can not be performed in the redundant server 20. Therefore, for example, as shown in FIG. 14, an entry having "SID" as a conversion key is prepared in the conversion table 31. By processing of FIG. 13A, when a key matching a conversion key such as "SID=30" exists in processing results of the redundant server 20, the value "30" of the key is registered in the conversion table 31 as shown in FIG. 14. By processing of FIG. 13B, if a key matching a conversion key such as "SID=20" exists in the next and later processing requests, the value "20" of the key is converted into the value "30" set in the conversion table 31 and then sent it to the redundant server 20. Thereby, the same session management as in the active server 10 becomes possible also in the redundant server 20.

Although Example 5 is premised on Example 1, an example is thinkable in which the conversion table 31 and the transaction converting means 30 are added to the second processing module 2 in any of Examples 2 to 4.

According to this example, in addition to the effects obtained by the above mentioned examples, the value of a parameter of a processing request given to the redundant system can be changed into a converted value different from the value of the corresponding processing request given to the active system.

In addition to the above effect, when the value of a parameter of a processing request given to the redundant system is changed into a converted value different from the value of the corresponding processing request given to the active system, the converted value can be set in accordance with processing results of the processing request given to the redundant system.

EXAMPLE 6

Figure 15:
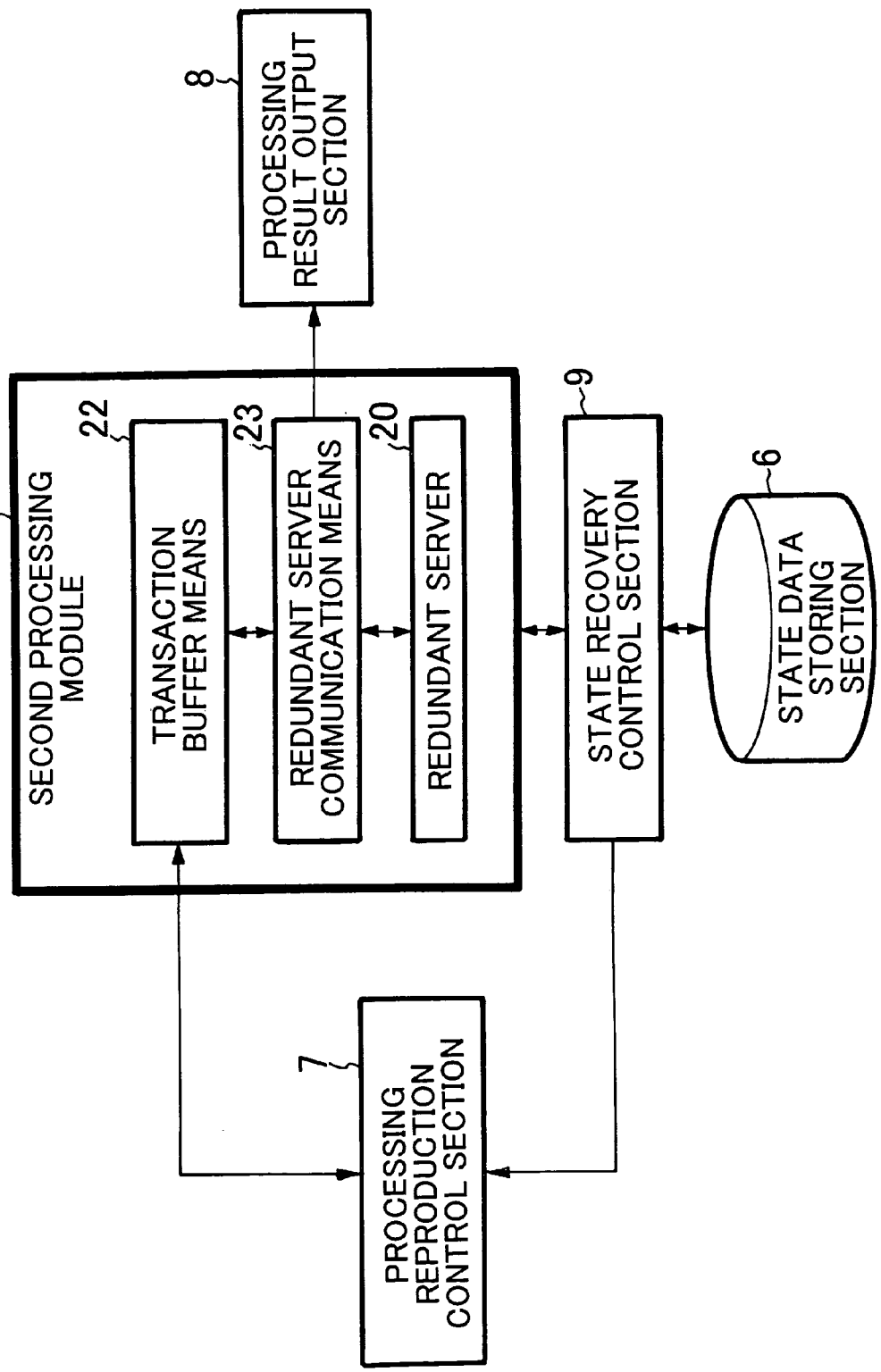
FIG. 15 is a block diagram of a second processing module in a transaction processing system according to Example 6 of the present invention.

Referring to FIG. 15, a transaction processing system according to Example 6 differs from the transaction processing system of Example 1 on the point that a processing reproduction control section 7, a processing result output section 8, and a state recovery control section 9 are further connected to the second processing module 2. In FIG. 15, illustration of the other components included in Example 1, such as the state storage control section 5 shown in FIG. 3, is omitted.

The state recovery control section 9 controls the processing state of the second processing module 2. The state recovery control section 9 receives an instruction of the processing reproduction control section 7 and recovers the second processing module 2 to the state at the time of being stored, using data stored in the state data storing section 6.

The processing reproduction control section 7 receives an input of a user and issues an instruction for controlling the processing state of the second processing module 2. As instructions, there are a processing restart instruction, a pause instruction, an instruction for collecting the internal state of the redundant server 20, and so on.

The processing result output section 8 performs output for displaying processing results of the redundant server 20 and so on. The user investigates processing results of the redundant server 20, the internal state of the redundant server 20, and so on, displayed on the processing result output section 8 to specify the cause of the trouble.

Figure 16:
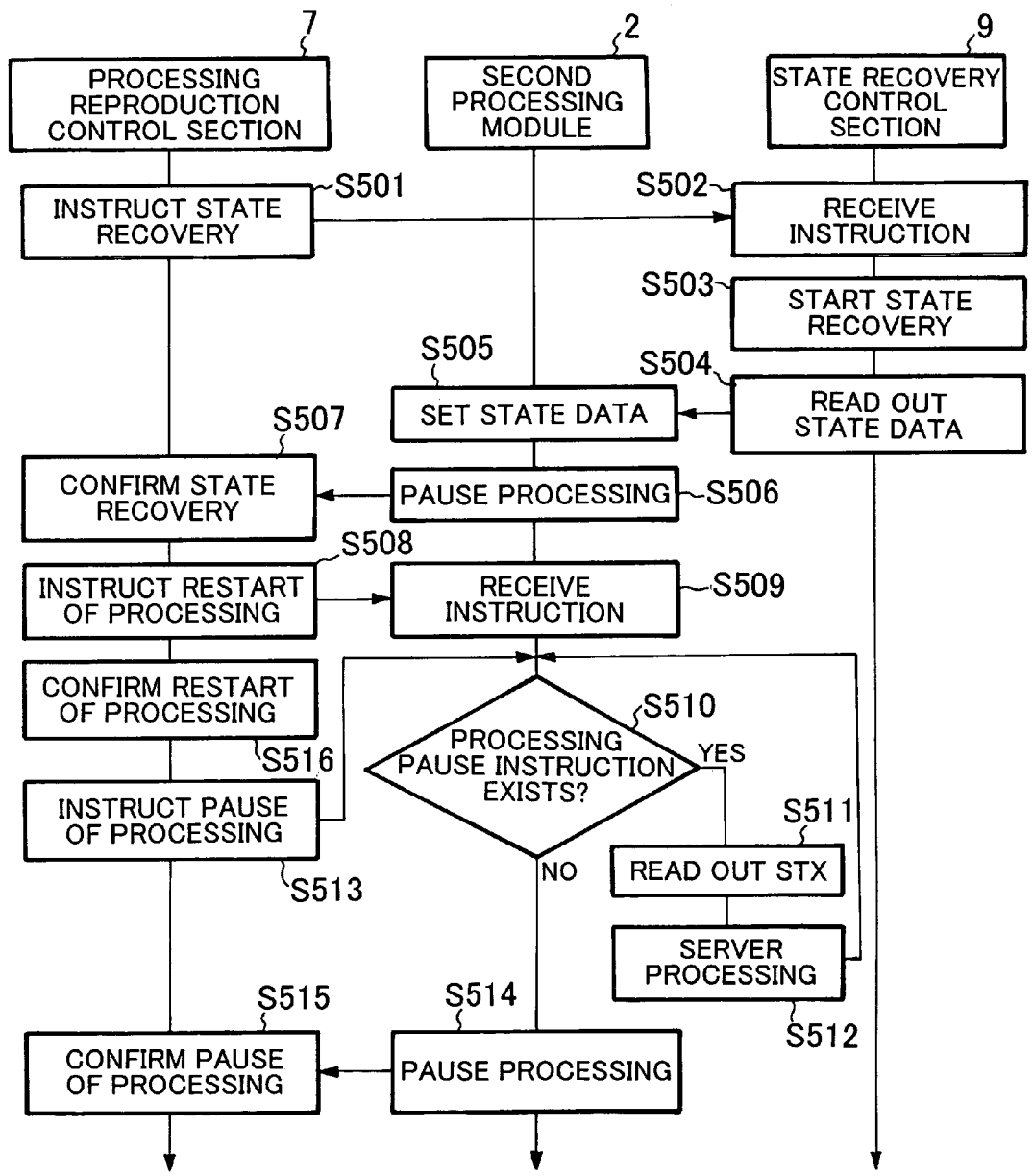
FIG. 16 is a flowchart showing an operation in the transaction processing system according to Example 6 of the present invention.

Next, an operation of this example will be described with reference to the block diagram of FIG. 15 and the flowchart of FIG. 16.

When an instruction for state recovery is issued by a user, the processing reproduction control section 7 sends the instruction for state recovery to the state recovery control section 9 (S501). The state recovery control section 9 having received the instruction starts state recovery (S502, S503), reads out state data stored in the state data storing section 6 (S504), and sets it to the second processing module 2 (S505). Thereby, the transaction buffer means 22, the redundant server communication means 23, and the redundant server 20 of the second processing module 2 are recovered to the state at the time when the state storage was performed, and processing is in a pause state (S506). When the processing reproduction control section 7 confirms that the recovery of the second processing module 2 is completed, the processing reproduction control section 7 notifies the user of that effect (S507). Afterward, the user restarts or stops processing of the second processing module 2 through the processing reproduction control section 7 and observes behavior till occurrence of the trouble and the state at the time of occurrence of the trouble to investigate the cause of the trouble.

When the processing reproduction control section 7 receives an instruction for processing restart from the user, the processing reproduction control section 7 transmits the instruction for processing restart to the second processing module 2 (S508). In the second processing module 2, when the redundant server communication means 23 receives the instruction for processing restart (S509), till the redundant server communication means 23 receives an instruction for processing stop (S510), the redundant server communication means 23 reads out processing requests stored in the transaction buffer means 22, in order (S511), and processes them in the redundant server 20 (S512). The processing reproduction control section 7 confirms that processing has restarted, and notifies the user of that effect (S516). On the other hand, when the processing reproduction control section 7 receives an instruction for processing stop from the user, the processing reproduction control section 7 transmits the instruction for processing stop to the second processing module 2 (S513), and the second processing module 2 temporarily stops processing (S514). When the processing reproduction control section 7 confirms that processing has been stopped, the processing reproduction control section 7 notifies the user of that effect (S515).

As described above, in this example, using data of a processing state capable of continuing processing before the trouble appears, the process can be restarted and processing results can be confirmed. Thus, investigation of the cause of the trouble by reproduction of the trouble becomes possible.

Although Example 6 is premised on Example 1, an example is thinkable in which the processing reproduction control section 7, the processing result output section 8, and the state recovery control section 9 are added to the second processing module 2 in any of Examples 2 to 4.

Although examples of the present invention have been described, the present invention is not limited to the above examples and various other additional changes can be made therein. Functional means in each example, such as the trouble monitoring section 4, the state storage control section 5, the processing reproduction control means 7, the processing result output means 8, the state recovery control section 9, the client communication means 11, the transaction duplicating means 12, the active server communication means 13, the transaction buffer means 22, the redundant server communication means 23, the timer 24, and the transaction converting means 30, can be realized by a computer and a state acquisition program. The state acquisition program is provided in a form of being recorded on a computer readable record medium such as a magnetic disk, and reads out by the computer at the time of starting the computer and so on, to control the operation of the computer and thereby realize each of the above-described functional means on the computer.

According to the present invention, when a trouble occurs in a transaction processing system, particularly in a processing program therein, the invention can be applied to use for storing a state immediately before stop due to and the trouble and investigating the cause of the trouble.

What is claimed is:

1. A computer system comprising:
an active system in which a program operates;

a redundant system in which the same program as the program operates with a delay in the same execution environment as the active system;

state storing means for storing a state of the redundant system when a trouble occurs in the active system;

a buffer that stores therein the same processing request as a processing request given to the active system; and communication means for reading out a processing request from the buffer and for giving it to the redundant system.

2. A computer system comprising: an active system in which a program operates;

a redundant system in which the same program as the program operates in the same execution environment as the active system;

delay execution control means for giving the redundant system the same processing request as a processing request given to the active system, with a delay;

trouble monitoring means for detecting presence/absence of a trouble of the active system;

state storage control means for storing, in a state data storing section, data indicating a state of the redundant system at the time when the trouble monitoring means detects a trouble of the active system;

wherein the delay execution control means includes a buffer that stores therein the same processing request as a processing request given to the active system; and communication means for reading out a processing request from the buffer and for giving it to the redundant system.

3. The computer system according to claim 2, wherein the communication means reads out a processing request from the buffer after the processing request is kept in the buffer for at least a predetermined time.

4. The computer system according to claim 2, wherein the communication means reads out the oldest one of processing requests stored in the buffer when the number of processing requests stored in the buffer exceeds a predetermined number.

5. The computer system according to claim 2, wherein the communication means reads out, from the buffer, the same processing request as a processing request given to the active system, when processing of the processing request given to the active system is completed.

6. The computer system according to claim 2, further comprising: state recovery control means for recovering a state of the redundant system using data stored in the state data storing section;

processing reproduction control means for restarting processing of the redundant system from the recovered state; and processing result output means for outputting processing results of the redundant system restarted.

7. A computer system comprising: an active system in which a program operates;

a redundant system in which the same program as the program operates in the same execution environment as the active system;

delay execution control means for giving the redundant system the same processing request as a processing request given to the active system, with a delay;

trouble monitoring means for detecting presence/absence of a trouble of the active system; and state storage control means for storing, in a state data storing section, data indicating a state of the redundant system at the time when the trouble monitoring means detects a trouble of the active system;

wherein the delay execution control means includes a buffer that stores therein the same processing request as a processing request given to the active system, and the computer system further comprises converting means for converting a value of a predetermined parameter contained in a processing request into a converted value by referring to a conversion table holding therein the converted value of the predetermined parameter, before the processing request stored in the buffer is read out to be given to the redundant system.

8. The computer system according to claim 7, wherein the converting means sets the converted value of the conversion table in accordance with processing results of the processing request given to the redundant system.

9. A state acquisition method comprising:

executing the same program as a program that operates in an active system, with a delay in a redundant system having the same execution environment as the active system;

storing, in a state data storing section, data indicating a state of the redundant system at the time when a trouble occurs in the active system;

storing, in a buffer, the same processing request as a processing request given to the active system; and reading out a processing request from the buffer to be given to the redundant system.

10. A state acquisition method comprising:

a first step of an act of executing the same program as a program that operates in an active system, in parallel in a redundant system having the same execution environment as the active system;

a second step of an act of giving the redundant system the same processing request as a processing request given to the active system, with a delay;

a third step of an act of detecting presence/absence of a trouble of the active system; and a fourth step of an act of storing, in a state data storing section, data indicating a state of the redundant system at the time when a trouble of the active system is detected;

wherein the second step of the act of giving includes processing of storing, in a buffer, the same processing request as a processing request given to the active system; and reading out a processing request from the buffer to be given to the redundant system.

11. The state acquisition method according to claim 10, wherein the second step of the act of giving includes keeping each processing request in the buffer for at least a predetermined time.

12. The state acquisition method according to claim 10, wherein the second step of the act of giving includes reading out the oldest one of processing requests stored in the buffer, when the number of processing requests stored in the buffer exceeds a predetermined number.

13. The state acquisition method according to claim 10, wherein the second step of the act of giving includes reading out, from the buffer, the same processing request as a processing request given to the active system, when processing of the processing request given to the active system is completed.

14. The state acquisition method according to claim 10, further comprising:

a step of an act of recovering a state of the redundant system using data stored in the state data storing section;

a step of an act of restarting processing of the redundant system from the recovered state; and a step of an act of outputting processing results of the redundant system restarted.

15. A state acquisition method comprising:
a first step of an act of executing the same program as a program that operates in an active system, in parallel in a redundant system having the same execution environment as the active system;
a second step of an act of giving the redundant system the same processing request as a processing request given to the active system, with a delay;
a third step of an act of detecting presence/absence of a trouble of the active system; and
a fourth step of an act of storing, in a state data storing section, data indicating a state of the redundant system at the time when a trouble of the active system is detected;
wherein the second step the act of giving includes processing of storing, in a buffer, the same processing request as a processing request given to the active system, and the method further comprises a fifth step of an act of converting a value of a predetermined parameter contained in a processing request into a converted value by referring to a conversion table holding therein the converted value of the predetermined parameter, before the processing request stored in the buffer is read out to be given to the redundant system.

16. The state acquisition method according to claim 15, further comprising: a step of an act of setting the converted value of the conversion table in accordance with processing results of the processing request given to the redundant system.

17. A computer readable medium containing a state acquisition program state acquisition program product causing a computer to function as:
delay execution control means for executing the same program as a program that operates in an active system, with a delay in a redundant system having the same execution environment as the active system;
state storing means for storing a state of the redundant system at the time when a trouble occurs in the active system;
a buffer that stores therein the same processing request as a processing request given to the active system; and
communication means for reading out a processing request from the buffer and for giving it to the redundant system.

18. A computer readable medium containing a state acquisition program state acquisition program product causing a computer to function as:
delay execution control means for giving the same processing request as a processing request given to an active system in which a program operates, to a redundant system in which the same program as the program operates in the same execution environment as the active system, with a delay;
trouble monitoring means for detecting presence/absence of a trouble of the active system; and
state storage control means for storing, in a state data storing section, data indicating a state of the redundant system at the time when the trouble monitoring means detects a trouble of the active system;
wherein the delay execution control means includes a buffer that stores therein the same processing request as a processing request given to the active system; and
communication means for reading out a processing request from the buffer and for giving it to the redundant system.

19. The computer readable medium containing a state acquisition program state acquisition program product according to claim 18, wherein the
communication means reads out a processing request from the buffer after the processing request is kept in the buffer for at least a predetermined time.

20. The computer readable medium containing a state acquisition program state acquisition program product according to claim 18, wherein the
communication means reads out the oldest one of processing requests stored in the buffer when the number of processing requests stored in the buffer exceeds a predetermined number.

21. The computer readable medium containing a state acquisition program state acquisition program product according to claim 18, wherein the
communication means reads out, from the buffer, the same processing request as a processing request given to the active system, when processing of the processing request given to the active system is completed.

22. The computer readable medium containing a state acquisition program state acquisition program product according to claim 18 causing the computer to further function as:
state recovery control means for recovering a state of the redundant system using data stored in the state data storing section;
processing reproduction control means for restarting processing of the redundant system from the recovered state; and
processing result output means for outputting processing results of the redundant system restarted.

23. A computer readable medium containing a state acquisition program state acquisition program product causing a computer to function as:
delay execution control means for giving the same processing request as a processing request given to an active system in which a program operates, to a redundant system in which the same program as the program operates in the same execution environment as the active system, with a delay;
trouble monitoring means for detecting presence/absence of a trouble of the active system; and
state storage control means for storing, in a state data storing section, data indicating a state of the redundant system at the time when the trouble monitoring means detects a trouble of the active system
wherein the delay execution control means includes a buffer that stores therein the same processing request as a processing request given to the active system, and the state acquisition program product causes the computer to further function as converting means for converting a value of a predetermined parameter contained in a processing request into a converted value by referring to a conversion table holding therein the converted value of the predetermined parameter, before the processing request stored in the buffer is read out to be given to the redundant system.

24. The computer readable medium containing a state acquisition program state acquisition program product according to claim 23, wherein the converting means sets the converted value of the conversion table in accordance with processing results of the processing request given to the redundant system.

* * * * *